US012508161B2

(12) United States Patent
Diao et al.

(10) Patent No.: US 12,508,161 B2
(45) Date of Patent: Dec. 30, 2025

(54) SINGLE-FIBER ILLUMINATED LASER PROBE WITH ADJUSTABLE COLOR

(71) Applicant: Alcon Inc., Fribourg (CH)

(72) Inventors: Chenguang Diao, Irvine, CA (US); Alireza Mirsepassi, Irvine, CA (US); Ronald T. Smith, Irvine, CA (US)

(73) Assignee: Alcon, Inc., Fribourg (CH)

( * ) Notice: Subject to any disclaimer, the term of this patent is extended or adjusted under 35 U.S.C. 154(b) by 279 days.

(21) Appl. No.: 18/303,058

(22) Filed: Apr. 19, 2023

(65) Prior Publication Data

US 2023/0346599 A1 Nov. 2, 2023

Related U.S. Application Data

(60) Provisional application No. 63/363,737, filed on Apr. 28, 2022.

(51) Int. Cl.
*A61F 9/008* (2006.01)

(52) U.S. Cl.
CPC .................. *A61F 9/008* (2013.01)

(58) Field of Classification Search
CPC ... A61B 1/0638; A61B 1/0669; A61B 1/0684; A61B 1/07; A61B 2018/00589; A61B 2018/00595; A61B 2090/306; A61B 3/0008; A61F 2009/00863; A61F 9/008; A61F 9/00821; C12Q 1/6886; C12Q 2600/154; G02B 6/02395; G02B 6/036
See application file for complete search history.

(56) References Cited

U.S. PATENT DOCUMENTS

| | | |
|---|---|---|
| 6,587,269 B2 | 7/2003 | Li |
| 7,168,810 B2 | 1/2007 | Peterson et al. |
| 7,210,815 B2 | 5/2007 | Imade |
| 7,325,956 B2 | 2/2008 | Morejon et al. |
| 7,540,616 B2 | 6/2009 | Conner |
| 7,710,669 B2 | 5/2010 | Li |
| 7,821,713 B2 | 10/2010 | Magarill et al. |
| 7,832,878 B2 | 11/2010 | Brukilacchio et al. |
| 7,944,612 B2 | 5/2011 | Robinson |
| 8,029,142 B2 | 10/2011 | Conner et al. |
| 8,317,331 B2 | 11/2012 | Li |
| 8,351,122 B2 | 1/2013 | Teijido et al. |
| 8,488,930 B2 | 7/2013 | Papac et al. |
| 8,550,681 B2 | 10/2013 | Sommer et al. |
| 11,160,686 B2 | 11/2021 | Cook et al. |
| 11,172,560 B2 | 11/2021 | Smith |
| 2006/0227302 A1 | 10/2006 | Harbers et al. |
| 2008/0030974 A1 | 2/2008 | Abu-ageel |
| 2015/0150456 A1 | 6/2015 | Brennan et al. |
| 2017/0059763 A1* | 3/2017 | Lucrecio .................. H02J 7/35 |

(Continued)

FOREIGN PATENT DOCUMENTS

JP 2015178995 A 10/2015

*Primary Examiner* — Scott Luan

(74) *Attorney, Agent, or Firm* — Patterson + Sheridan, LLP

(57) ABSTRACT

Embodiments of the present disclosure relate to improved surgical laser systems with single-core single-optical fiber-illuminated laser probes, which are configured to propagate both treatment laser beams and illumination light beams. More particularly, embodiments of the present disclosure provide surgical laser systems with color adjustability of illumination light, as well as improved laser probe stiffness.

16 Claims, 11 Drawing Sheets

(56) References Cited

U.S. PATENT DOCUMENTS

2019/0099612 A1* 4/2019 Hiereth .................. A61B 1/07
2021/0173143 A1   6/2021 Diao et al.
2022/0268990 A1   8/2022 Diao et al.

* cited by examiner

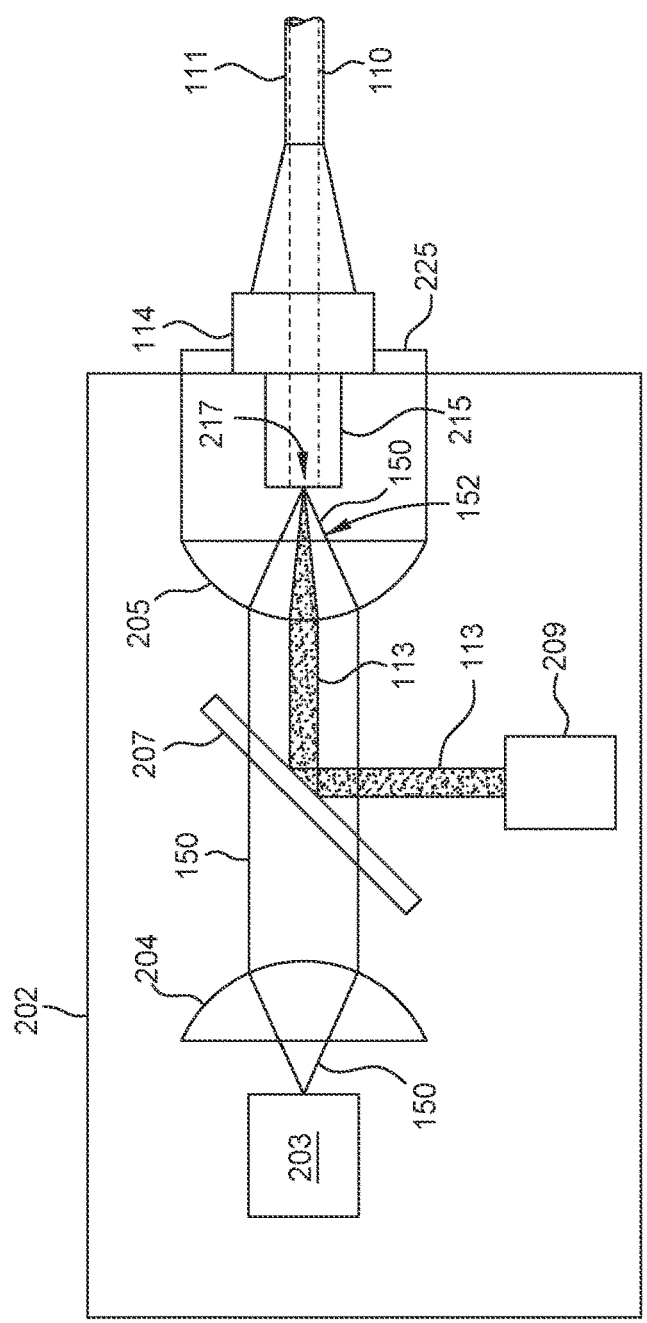
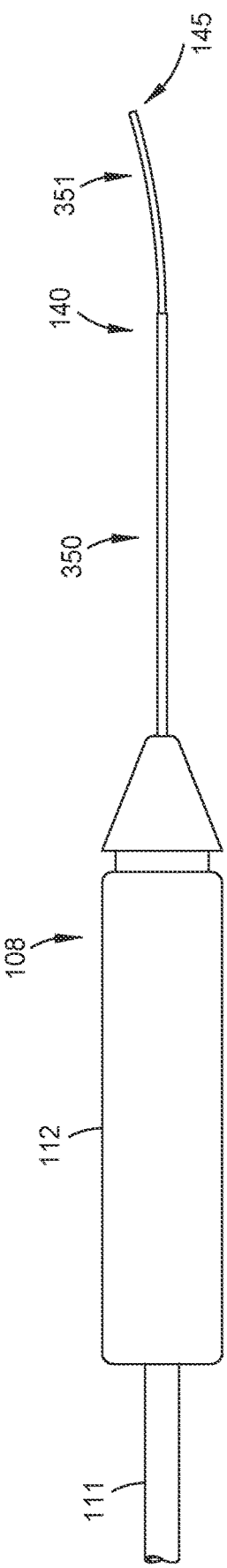
FIG. 2
FIG. 3

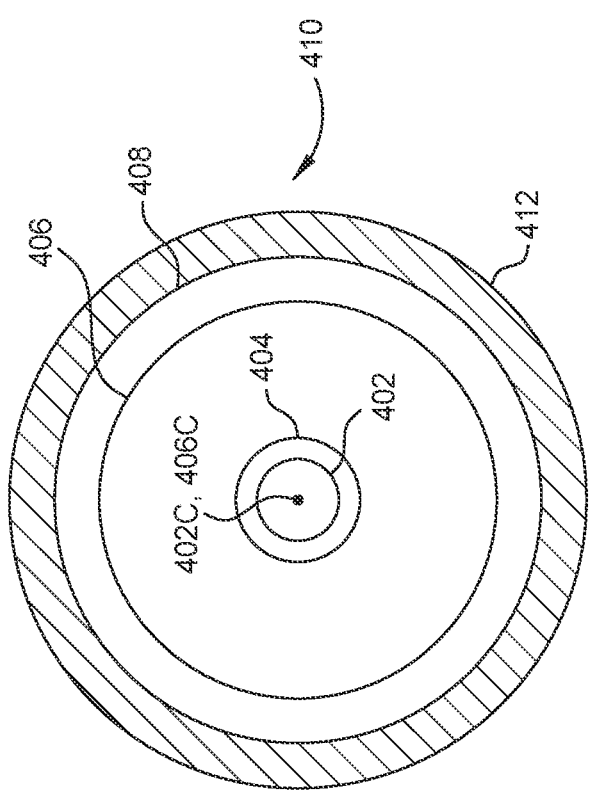
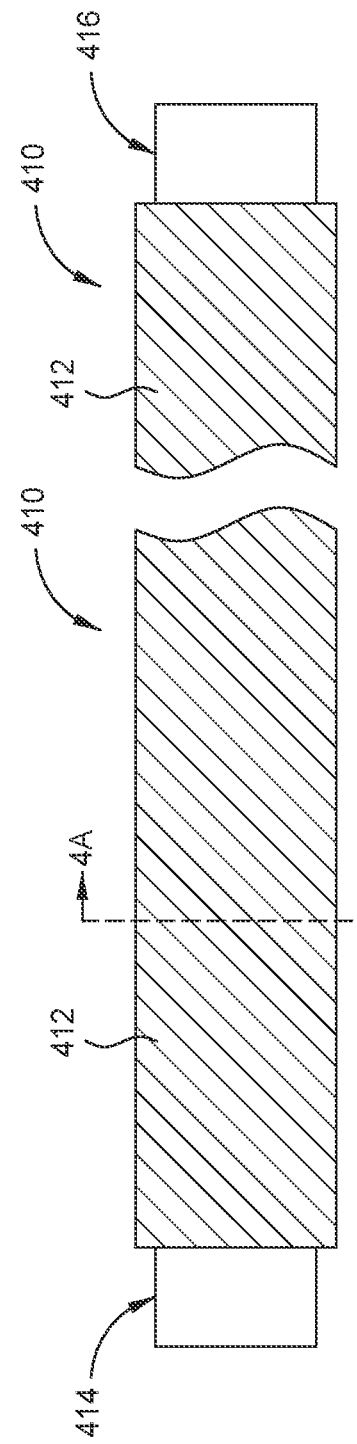
FIG. 4A
FIG. 4B

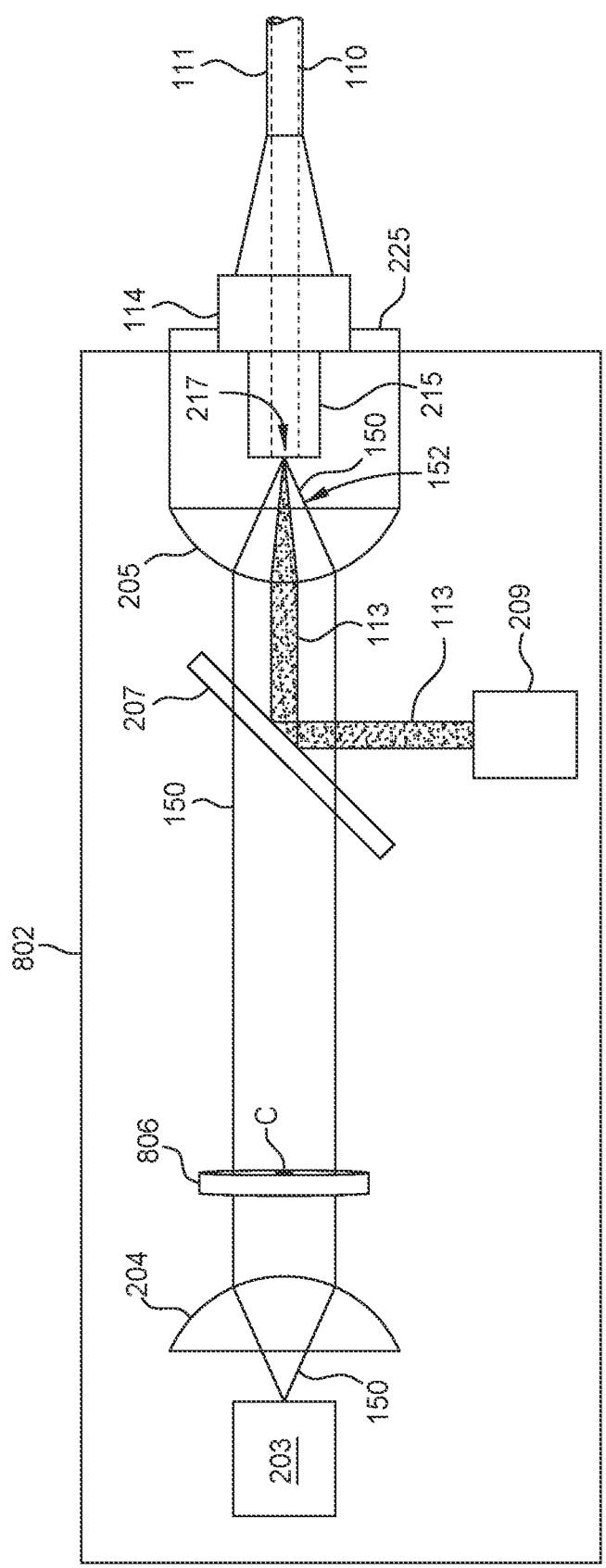
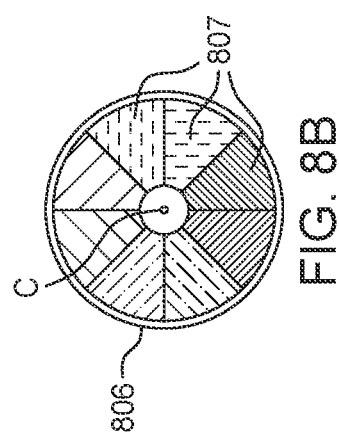
FIG. 8A
FIG. 8B

SINGLE-FIBER ILLUMINATED LASER PROBE WITH ADJUSTABLE COLOR

This application claims the benefit of priority of U.S. Provisional Patent Application Ser. No. 63/363,737, titled "SINGLE-FIBER ILLUMINATED LASER PROBE WITH ADJUSTABLE COLOR," filed on Apr. 28, 2022, which is hereby incorporated by reference in its entirety as though fully and completely set forth herein.

BACKGROUND

In a wide variety of medical procedures, laser light is used to treat patient anatomy. For example, in laser photocoagulation, a laser system comprising a laser probe is used to cauterize, e.g., blood vessels on the retina. Some laser systems include an optical fiber cable containing one fiber for delivering laser light to the surgical site during an eye surgery procedure, and a separate fiber for simultaneously delivering illumination light, for instance, during a bimanual operation. In such cases, one of the two fibers is connected to a laser source through a first port to deliver the laser beam, and the other fiber is connected to an illumination source through a second port for illumination light, and the two fibers are combined and tightly packed within a tube of the optical fiber cable to minimize the size of the optical fiber cable and, therefore, the size of the probe tip where the optical fiber cable is placed. Using a probe tip with a smaller gauge size is advantageous because it facilitates minimization of incision size on the eye (for example, mini-invasive eye surgery), and helps patients recover faster post-surgery.

Yet, an optical fiber cable containing a laser fiber as well as an illumination fiber can only be made so narrow, because there must be room for both the illumination fiber and the laser fiber to be placed side-by-side in the tube. Narrowing of the two fibers themselves results in lower laser coupling efficiency and insufficient illumination to perform the medical procedure. Further, the fabrication of a probe for integrating the two separate fibers (where one fiber is for the laser beam, and the other fiber is for the illumination light) is complicated and costly, and handling of a probe with two fibers connected to separate ports during a procedure is difficult. In addition, the thermal robustness of the probe is an issue at high laser powers due to the plastic fiber used for illumination light, and the adhesive used to bind the fibers together at the distal end of the probe. Thus, single-fiber illuminated laser systems may be more advantageous in certain situations as compared to multi-fiber illuminated laser systems.

Certain single-fiber illuminated laser systems utilize a single optical fiber having a single core and one or more claddings. In such cases, the core may be configured to deliver both laser light and illumination light, while the one or more claddings may be configured to deliver only illumination light. In effect, the single optical fiber may deliver both laser light and illumination to the surgical site, thus enabling a narrower probe tip as compared to a two-fiber system for minimization of incision size during surgical procedures. Further, the single-core optical fiber may be connected to a single port comprising both a laser source and an illumination source, thereby facilitating easier handling of an illuminated laser probe during a procedure. And, because utilization of a single optical fiber eliminates the need for fiber-binding adhesives, single-fiber illuminated laser systems may exhibit greater thermal robustness.

Still, current single-fiber illuminated laser systems are not without their own drawbacks. For example, current single-fiber laser systems are typically limited to a single color of illumination light. During certain medical procedures, however, it may be beneficial for a surgeon to utilize illumination light of different colors in order to better visualize certain anatomical structures. Furthermore, illuminated laser probes utilized with current single-fiber illuminated laser systems may provide suboptimal stiffness, as the dimensions of such probes are reduced to account for probe curvature (which enables high-angle illumination), as well as the dimensions of small-gauge cannulas through which these probes are inserted into the eye.

Accordingly, what is needed in the art is an improved single fiber illuminated laser system having a high-angle illumination output with color adjustability, and a small-gauge illuminated laser probe with improved stiffness.

SUMMARY

According to certain embodiments, a surgical laser system is provided, comprising: a laser source configured to emit a laser light; an illumination source configured to emit a color-adjustable illumination light, the illumination source comprising a plurality of light-emitting diodes (LEDs) arranged on a light scattering cell; an optical fiber comprising a fiber core circumferentially surrounded by one or more cladding layers, wherein the fiber core is configured to transmit the laser light emitted from the laser source and the illumination light emitted from the illumination source, and wherein the one or more cladding layers are configured to transmit only the illumination light emitted from the illumination source; and an optical relay system configured to direct the laser light emitted from the laser source onto the fiber core and the illumination light emitted from the illumination source onto the fiber core and the one or more cladding layers.

According to certain embodiments, a surgical laser system is provided, comprising: a laser source configured to emit a laser light; an illumination source configured to emit a color-adjustable illumination light, the illumination source comprising: a red-green-blue (RGB) light-combining prism configured to combine monochromatic light emitted from a plurality of light-emitting diodes (LEDs) into the illumination light, the plurality of LEDs comprising at least a red LED, a green LED, and a blue LED; the plurality of LEDs comprising at least the red LED, the green LED, and the blue LED, the plurality of LEDs arranged around the RGB light-combining prism and configured to emit the monochromatic; and a collimator mated to each of the plurality of LEDs and configured to direct the monochromatic light emitted from the LED toward the RGB light-combining prism; an optical fiber comprising a fiber core circumferentially surrounded by one or more cladding layers, wherein the fiber core is configured to transmit the laser light emitted from the laser source and the illumination light emitted from the illumination source, and wherein the one or more cladding layers are configured to transmit only the illumination light emitted from the illumination source; and an optical relay system configured to direct the laser light emitted from the laser source onto the fiber core and the illumination light emitted from the illumination source onto the fiber core and the one or more cladding layers.

According to certain embodiments, a surgical laser system is provided, comprising: a laser source configured to emit a laser light; an illumination source configured to emit an illumination light; a filter assembly configured to transmit and adjust a color of the illumination light emitted by the illumination source, wherein the color of the illumination light emitted by the illumination source may be adjusted by changing a physical position or orientation of the filter assembly; an optical fiber comprising a fiber core circumferentially surrounded by one or more cladding layers, wherein the fiber core is configured to transmit the laser light emitted from the laser source and the illumination light emitted from the illumination source and transmitted through the filter assembly, and wherein the one or more cladding layers are configured to transmit only the illumination light emitted from the illumination source and transmitted through the filter assembly; and an optical relay system configured to direct the laser light emitted from the laser source onto the fiber core and the illumination light emitted from the illumination source and transmitted through the filter assembly onto the fiber core and the one or more cladding layers.

According to certain embodiments, a stiffness of an illuminated laser probe is increased by beveling a distal endface of an optical fiber to increase an illumination angle thereof, thereby allowing a reduced curvature of the probe and thus, an enlarged thickness, without sacrificing illumination angle and/or ease of insertion/removal of the probe from, e.g., a trocar cannula.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, and may admit to other equally effective embodiments.

FIG. 2 illustrates a schematic plan view of a surgical laser system, in accordance with certain embodiments of the present disclosure.

FIG. 3 illustrates a plan view of a probe, in accordance with certain embodiments of the present disclosure.

FIGS. 4A-4C illustrate different views of an optical fiber, in accordance with certain embodiments of the present disclosure

FIG. 8A illustrates a schematic plan view of a surgical laser system with mechanically color-adjustable illumination light, in accordance with certain embodiments of the present disclosure. FIG. 8B illustrates an enlarged front view of a component of the surgical laser system of FIG. 8A.

To facilitate understanding, identical reference numerals have been used, where possible, to designate identical elements that are common to the Figures. It is contemplated that elements and features of one embodiment may be beneficially incorporated in other embodiments without further recitation.

DETAILED DESCRIPTION

Figure 1:
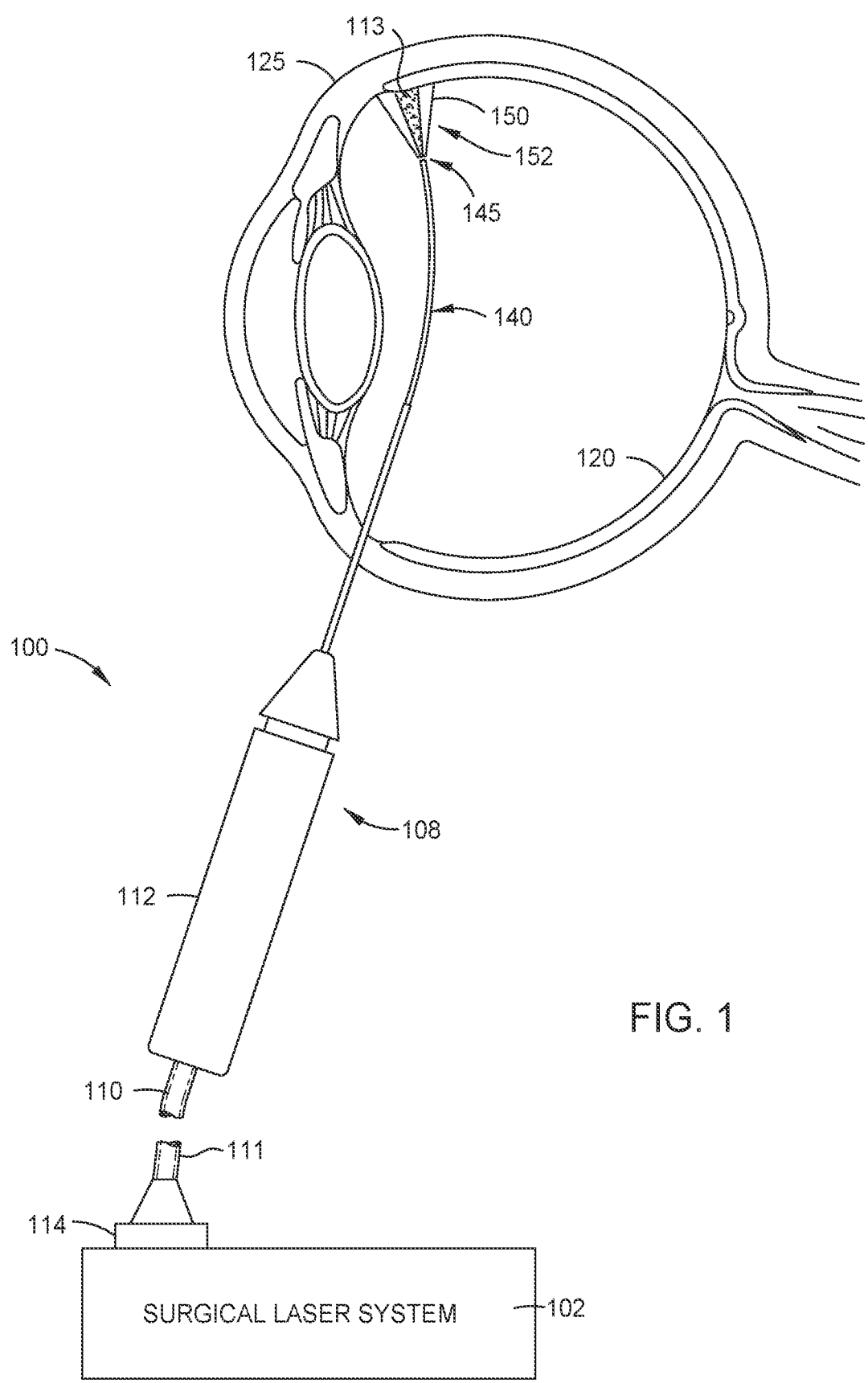
FIG. 1 illustrates a plan view of a system for generating laser and illumination light beams for delivery to a surgical target, in accordance with certain embodiments of the present disclosure.

In the following description, details are set forth by way of example to facilitate an understanding of the disclosed subject matter. It should be apparent to a person of ordinary skill in the field, however, that the disclosed implementations are exemplary and not exhaustive of all possible implementations. Thus, it should be understood that reference to the described examples is not intended to limit the scope of the disclosure. Any alterations and further modifications to the described devices, instruments, methods, and any further application of the principles of the present disclosure are fully contemplated as would normally occur to one skilled in the art to which the disclosure relates. In particular, it is fully contemplated that the features, components, and/or steps described with respect to one implementation may be combined with the features, components, and/or steps described with respect to other implementations of the present disclosure.

Embodiments of the present disclosure generally relate to improved surgical laser systems for ophthalmic procedures. More particularly, embodiments of the present disclosure relate to improved surgical laser systems with single-core single-optical fiber-illuminated laser probes, which are configured to propagate both treatment laser beams and illumination light beams.

Conventional ophthalmic illuminated laser probes typically utilize two separate fibers: one fiber for delivery of a laser beam, and another fiber for delivery of illumination light. The two fibers are combined and tightly packed within an optical fiber cable that is placed within a probe tip of the illuminated laser probe. Narrower optical fiber cables are generally preferred in order to minimize a size of the probe tip. However, an optical fiber cable containing a laser fiber and an illumination fiber can only be made so narrow, and narrowing of the fibers themselves results in lower laser coupling efficiency and insufficient illumination to perform ophthalmic procedures. Further, fabrication of probes for integrating two separate fibers is complicated and costly, and handling of a probe with fibers connected to separate ports is difficult. Thus, single-fiber illuminated laser systems, wherein illumination and laser beams are delivered via a single, integrated fiber, may be more advantageous for many different types of ophthalmic procedures requiring bimanual operation by a surgeon.

Still, current single-fiber illuminated laser systems are typically limited to white light illumination. In many scenarios, however, it may be beneficial to color-tune the illumination light output of a laser probe to better reveal textures of different tissues, or to make a laser treatment beam more visible (e.g., more obvious) to the surgeon in order to deliver laser coagulation treatment more accurately.

Furthermore, many conventional illuminated laser probes sacrifice probe stiffness in exchange for the necessary curvature to provide a high illumination angle for illuminating the periphery of an ocular space, as well as the necessary slenderness for being inserted or removed from a trocar cannula without any difficulties (e.g., accidental removal of the trocar cannula while removing the probe). The reduced probe stiffness, however, causes reduced probe stability while maneuvering the probe during ophthalmic procedures, thereby increasing the difficulty of accurately placing the probe and directing the laser treatment beam during such procedures.

Accordingly, in certain embodiments, the methods and systems disclosed herein enable color adjustability of illumination output from a single-core single-optical fiber-illuminated laser probe, thereby facilitating improved contrast between different types of tissues and improved accuracy of treatment. Further, in certain embodiments, the methods and systems disclosed herein enable improved probe stiffness for single-core single-optical fiber-illuminated laser probes while maintaining high illumination angle and ease of insertion or removal from a patient's eye.

As used herein, the term "color" may refer to a hue, tint, tone, or shade of, e.g., visible light, which is defined by wavelength of the visible light along the electromagnetic spectrum.

As used herein, the term "about" may refer to a +/−10% variation from the nominal value. It is to be understood that such a variation can be included in any value provided herein.

FIG. 1 illustrates a plan view of system 100 for generating an illumination light beam as well as a laser beam for delivery to a surgical target, in accordance with certain embodiments of the present disclosure. As shown, system 100 includes surgical laser system 102 and probe 108. System 100 produces illumination light 150 and laser beam 113 to be delivered, for example, to retina 120 of patient eye 125.

Surgical laser system 102 includes one or more laser sources for generating laser beams, and an illumination light source for generating an illumination light, that can be used during an ophthalmic procedure. Accordingly, surgical laser system 102 may be an ophthalmic surgical laser system configured to generate laser beam 113 (e.g., a surgical treatment or aiming beam) and illumination light 150. A user, such as a surgeon or other medical practitioner, can control surgical laser system 102 (e.g., via a foot switch, voice commands, surgical console, etc.) to emit illumination light 150 to illuminate an ocular space of a patient, and to emit laser beam 113 to treat patient anatomy, e.g., perform photocoagulation.

In certain embodiments, surgical laser system 102 is integrated with one or more additional devices and/or systems. For example, in certain embodiments, surgical laser system 102 may be integrated into a surgical console, such as a surgical console for performing ophthalmic surgical procedures, including vitreoretinal procedures, cataract surgeries, corneal transplants, glaucoma surgeries, LASIK (Laser Assisted In Situ Keratomileusis) surgeries, refractive lens exchanges, trabeculectomies, keratotomy procedures, and/or keratoplasty surgeries, etc. Consoles that are capable of performing two or more of these procedures are also within the scope of this disclosure. An example of a console configured for performing vitreoretinal procedures is the Constellation® System available from Alcon Laboratories, Inc., Fort Worth, Texas. An example of a console configured for performing cataract surgeries is the Centurion® System available from Alcon Laboratories, Inc., Fort Worth, Texas.

As shown, system 100 further includes connector 114 that couples to port adapter of an optical port (shown in FIG. 2) of surgical laser system 102. FIG. 1 also shows optical fiber 110 inside optical fiber cable 111, the optical fiber 110 having a distal end that couples to and extends through probe 108, and a proximal end that couples to and extends through connector 114. In the example of FIG. 1, connector 114 includes a ferrule (shown in FIG. 2) with an opening in which the proximal end of optical fiber 110 is inserted. The proximal end of optical fiber 110 includes an interface plane (also referred to as a proximal entrance plane) upon which laser beam 113 and illumination light 150 from surgical laser system 102 may be focused when the ferrule is inserted into the optical port of surgical laser system 102. The interface plane of optical fiber 110 comprises the exposed proximal end of at least one core within optical fiber 110 where laser beam 113 and illumination light 150 may be directed to. In the example of FIG. 1, optical fiber 110 is a single-core optical fiber, with one or more claddings (i.e., cladding layers). As such, the interface plane of the proximal end of optical fiber 110 comprises the proximal end of a single core upon which laser beam 113 and illumination light 150 may be focused.

Optical fiber 110 delivers laser beam 113 and illumination light 150 to probe 108, which propagates the beams to retina 120 of patient eye 125. Probe 108 includes probe body 112 and probe tip 140 that house and protect the distal end of optical fiber 110.

In operation, a laser source (shown in FIG. 2) of surgical laser system 102 generates laser beam 113, while an illumination light source (shown in FIG. 2) generates illumination light 150. Surgical laser system 102 multiplexes laser beam 113 and illumination light 150 into multiplexed beam 152, and multiplexed beam 152 is directed to a lens (shown in FIG. 2) of surgical laser system 102 to focus multiplexed beam 152 onto the interface plane of the proximal end of optical fiber 110 within optical fiber cable 111, such that multiplexed beam 152 is transmitted along an entire length of optical fiber 110.

Multiplexed beam 152 is transmitted by optical fiber 110 to probe 108 disposed at a distal end of optical fiber cable 111. Multiplexed 152 beam exits probe tip 140 and is projected onto retina 120 of patient eye 125. Thus, surgical laser system 102 is configured to deliver multiplexed beam 152 to retina 120 through optical fiber 110 of optical fiber cable 111. Multiplexed beam 152 includes both laser beam 113 for treating the patient's eye 125 and illumination light 150 to aid the user with visualization, although the beam associated with laser beam 113 is narrower.

Note that, herein, a distal end of a component refers to the end that is closer to a patient's body, or where laser beam 113 and illumination light 150 are emitted out of probe 108. On the other hand, the proximal end of the component refers to the end that is facing away from the patient's body or in proximity to, for example, surgical laser source 102.

FIG. 2 illustrates a plan view of surgical laser system 202, in accordance with certain embodiments of the present disclosure. As shown, surgical laser system 202 includes at least first lens 204 (e.g., a collimating lens), beam splitter 207, optical fiber cable 111, second lens 205 (e.g., a focusing lens), illumination light source 203, and laser source 209.

Beam splitter 207 is downstream from first lens 204, second lens 205 is downstream from beam splitter 207, and optical fiber cable 111 is downstream from second lens 205. Note that in certain embodiments, surgical laser system 202 may include additional components, such as one or more lenses, diffractive elements, beam splitters, and other optical relay devices for relaying laser and illumination light beams between their respective sources and desired ports. Together with the optical devices described below, these components may be referred to as an "optical relay system."

As shown in FIG. 2, illumination light source 203 emits illumination light 150. At the outset of the surgery, a surgeon may activate illumination light source 203 to generate illumination light 150 in order to illuminate the inside of the patient eye's globe and make it easier to view the retina. Illumination light 150 can be any spectrum of illumination light, including, but not limited to, visible light or white light, and may be adjustable in color (e.g., wavelength, spectrum, etc.) according to the systems and methods described herein. In certain embodiments, illumination light source 203 includes a white light-emitting diode (LED) light source, a red-green-blue (RGB) LED light source, a broadband laser light source, an incoherent light source (e.g., a xenon or halogen light source), or the like.

Illumination light 150 is collimated by first lens 204 such that illumination light 150 is transformed into a beam of light with parallel rays, as shown in FIG. 2. Accordingly, first lens 204 may be referred to as a "collimating lens." First lens 204 can be any lens, including a plano-convex or biconvex lens. In certain embodiments, first lens 204 may be a multi-element achromat comprising two singlet lenses and one doublet lens. As shown, illumination light 150 emerges with parallel rays of light from the other side of first lens 204 and passes through beam splitter 207, which allows illumination light 150 to pass therethrough with only a small fraction of the light reflected off beam splitter 207. Illumination light 150 is then focused by second lens 205, as shown. Second lens 205 can be any lens used to focus light, including a plano-convex or biconvex lens. In certain embodiments, second lens 205 may be a multi-element achromat comprising two singlet lenses and one doublet lens. In such embodiments, second lens 205 has the same design as first lens 204, except that the assembly is reversed (e.g., rotated by 180 degrees), thereby creating a one-to-one magnification imaging system. Illumination light 150 and laser beam 113 are focused and incident on optical fiber cable 111 as multiplexed beam 152, which is described in greater detail below.

Second lens 205 focuses multiplexed beam 152 into an interface plane of a proximal end of optical fiber 110 that is contained within optical fiber cable 111. As shown, optical fiber cable 111 is coupled to optical port 225 of surgical laser system 202 via connector 114. Optical port 225 receives ferrule 215 within connector 114 that exposes an interface plane of the proximal end of optical fiber 110 contained within optical fiber cable 111. More specifically, the interface plane of the proximal end of optical fiber 110 is exposed through opening 217 of ferrule 215. Second lens 205 focuses multiplexed beam 152 onto an interface plane of the proximal end of optical fiber 110 such that multiplexed beam 152 is propagated through optical fiber 110 to the distal end of a surgical probe (e.g., probe 108 of FIG. 1) that is coupled to cable 111.

In certain embodiments, optical fiber 110 includes a core, a cladding, and a coating. In such embodiments, second lens 205 is configured to focus illumination light 150 onto both the core and the cladding, in which case both the cladding and the core may transmit illumination light 150. In yet some other embodiments, optical fiber 110 includes a core, an inner cladding, an outer cladding, and a coating. In such embodiments, illumination light 150 is focused on the core, the inner cladding, and the outer cladding, in which case the core, the inner cladding, and the outer cladding may all transmit illumination light 150.

Laser source 209 emits the laser beam 113. Laser beam 113 can have any desired wavelength, such as between about 532 nm (nanometers) to about 635 nm. In certain embodiments, laser source 209 can emit a variety of wavelengths desired by the user. Laser beam 113 is reflected by beam splitter 207 onto second lens 205. Laser beam 113 is then focused by second lens 205 onto an interface plane of the proximal end of optical fiber 110, as part of multiplexed beam 152. Laser beam 113 is transmitted by the core of optical fiber 110. Surgical laser system 202 provides both illumination light 150 and laser beam 113 to optical fiber 110 as multiplexed beam 152. Thus, a single fiber, including at least a core and a cladding, is capable of transmitting both laser beam 113 (through the core) and illumination light 150 (through the cladding and the core) in the same fiber.

FIG. 3 illustrates a plan view of probe 108, in accordance with certain embodiments of the present disclosure. As described above, probe 108 includes probe body 112 (e.g., a hand piece) shaped and sized for grasping by a user. Extending from probe body 112 is probe tip 140 with distal end 145. Optical fiber cable 111 typically comprises a fiber (e.g., fiber 110) surrounded by a polyvinyl chloride (PVC) tube for protecting the fiber during handling. The fiber extends through probe body 112 and into probe tip 140. Multiplexed beam 152 (shown in FIGS. 1-2) emanates from the distal end of the fiber and, thereby, distal end 145 of probe tip 140 onto the retina. In some embodiments, probe tip 140 comprises first straight portion 350 and second curved portion 351. First straight portion 350 includes a sleeve of probe tip 140, and second curved portion 351 includes a tube surrounding the fiber. The embodiment of FIG. 3 is merely shown as an example. In other examples, a probe tip may include first straight portion 350 and second curved portion 351, but without a sleeve. A variety of other configurations are also possible and are not outside the scope of this disclosure, as one of ordinary skill in the art can appreciate.

Figure 4C:
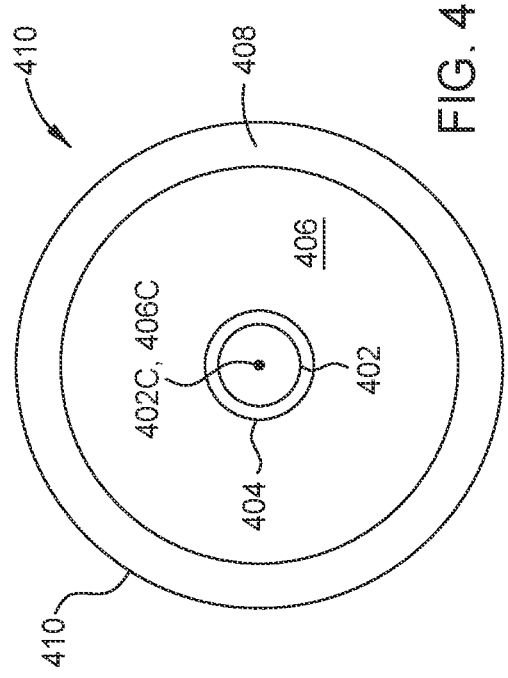

FIGS. 4A-4C illustrate various views of optical fiber 410, respectively, in accordance with certain embodiments of the present disclosure. Optical fiber 410 is one exemplary configuration of optical fiber 110 described above with reference to FIGS. 1-3, and is merely shown as an example. FIG. 4A illustrates a cross-sectional view of optical fiber 410, as taken from a central portion of optical fiber 410 disposed between proximal end 414 and distal end 416 thereof. As shown, optical fiber 410 includes core 402, optional inner cladding 404, outer cladding 406, coating 408 (e.g., a low refractive index cladding), and buffer 412. Inner cladding 404 surrounds core 402, and outer cladding 406 surrounds inner cladding 404. In embodiments without inner cladding 404, outer cladding 406 surrounds core 402.

Core 402, optional inner cladding 404, and/or outer cladding 406 may generally be formed of fused silica. In certain embodiments, the fused silica may further be doped with dopants such as germanium, fluorine, chlorine, boron, or any combination thereof. The dopants may change the optical properties of core 402 and claddings 404, 406, such as, for example, the refractive indexes thereof. Buffer 412 can include plastic, such as ethylene tetrafluoroethylene (ETFE).

FIG. 4B illustrates a plan view of optical fiber 410. As shown in FIG. 4B, buffer 412 is stripped at proximal end 414 of optical fiber 410 so that proximal end 414 of optical fiber 410 can be inserted into a ferrule. Buffer 412 is also stripped at distal end 416 of optical fiber 410 so that distal end 416 of optical fiber 410 can be inserted into probe 112 and/or probe tip 140, according to some embodiments.

FIG. 4C illustrates a front view of end face 418 of optical fiber 410. End face 418 may be a proximal or distal end face of optical fiber 410, e.g., located at either proximal end 414 or distal end 416. End face 418 includes core 402 disposed within the optional inner cladding 404 and outer cladding 406. Note, however, that end face 418 does not include buffer 412, as buffer 412 has been stripped from around ends 414, 416.

Laser beam 113 (shown in FIGS. 1-2), provided by laser source 209 of surgical laser system 202, is directed into core 402 of optical fiber 410. Thus, core 402 conducts laser beam 113 along the length of optical fiber 410. In certain embodiments, core 402 may be doped with one or more dopants (e.g., germanium) to increase the index of refraction of core 402 relative to claddings 404, 406. Accordingly, the refractive index of core 402 may be greater than the refractive indexes of claddings 404, 406, such that laser beam 113 traveling along core 402 is contained within core 402 and prevented from escaping from core 402 into claddings 404, 406. In certain embodiments, optional inner cladding 404 may prevent laser beam 113 from entering outer cladding 406 by causing partial or total internal reflection of laser beam 113, thus containing laser beam 113 in core 402. In such embodiments, the numerical aperture (NA) between core 402 and inner cladding 404 is from about 0.20 to about 0.30, such as about 0.22.

Both of core 402 and outer cladding 406, and in certain embodiments, optional inner cladding 404, may also transmit illumination light 150 (shown in FIGS. 1-2) from surgical laser system 202. Thus, the single optical fiber 410, is capable of simultaneously transmitting both laser beam 113 (through core 402) and illumination light 150 (through claddings 404,406 and core 402), thereby eliminating the need for a second optical fiber and/or cable during ophthalmic procedures. Further, the use of fused silica for core 402 and/or claddings 404, 406 for transmitting illumination light 150 may result in a more thermally stable fiber as compared to a conventional illumination fibers that are made of traditional plastic. Accordingly, optical fiber 410 may also be more thermally robust as compared to conventional fibers.

In certain embodiments, coating 408 is formed over outer cladding 406. Note that coating 408 may also be referred to as a cladding. In some instances, coating 408 is a hard polymer coating. In other instances, coating 408 is formed from other materials, such as acrylate. The refractive index of coating 408 is less than the refractive index of outer cladding 406, such that illumination light 150 traveling along outer cladding 406 is contained within outer cladding 406 and prevented from escaping from outer cladding 406 into coating 408. In certain embodiments, the numerical aperture (NA) between outer cladding 406 and coating 408 is greater than about 0.5 to provide the wide illumination angle required in some surgical cases.

Referring to FIGS. 4A and 4C, in certain embodiments, the diameter of core 402 is from about 70 μm (micrometer) to about 80 μm, the outer diameter of outer cladding 404 is from about 290 μm to about 300 μm, and the outer diameter of coating 408 is from about 320 μm to about 330 μm. The location of center 402c of core 402 is approximately the same location as center 406c of outer cladding 406, according to one embodiment.

Figure 5:
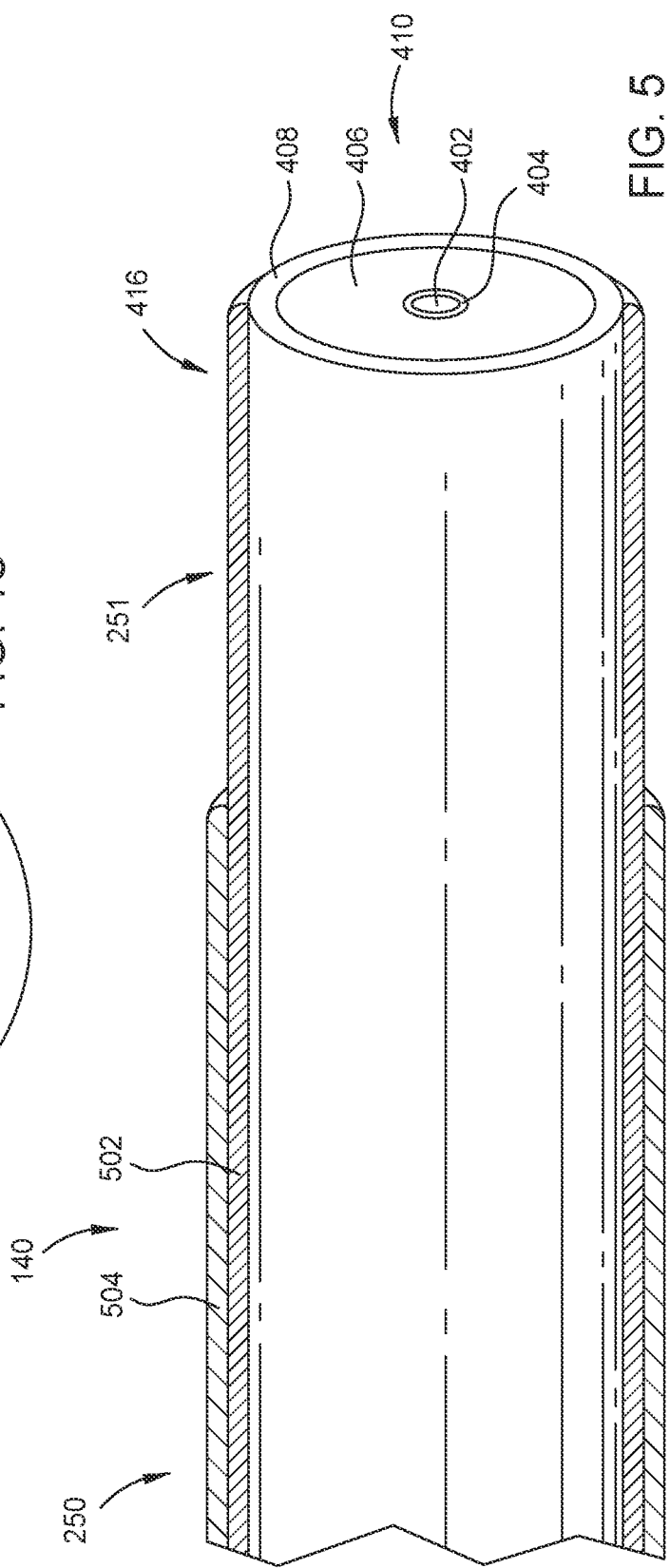
FIG. 5 illustrates a partial cross-sectional view of a probe tip and an optical fiber, in accordance with certain embodiments of the present disclosure.

FIG. 5 illustrates a partial cross-sectional view of probe tip 140 having optical fiber 410 inserted therein, in accordance with certain embodiments of the present disclosure. Distal end 416 of optical fiber 410, is partially surrounded by tube 502, and tube 502 is surrounded by sleeve 504 of probe tip 140. Tube 502 can include any suitable material, for example, Nitinol, nickel titanium, stainless steel, MP35N (e.g., a nickel-cobalt base alloy), or other alloys. Sleeve 504 can include, for example, stainless steel. In the example of FIG. 5, distal end 416 of optical fiber 410 and distal end of tube 502 surrounding optical fiber 410 extend beyond the distal end of sleeve 504 of probe tip 140. Thus, first straight portion 250 of probe tip 140 includes sleeve 504, whereas second curved portion 251 of probe tip 140 does not include sleeve 504, although distal end 416 is still surrounded by tube 502 in second curved portion 251. In other embodiments, sleeve 504 extends to cover the entire distal end 416 throughout probe tip 140. In other embodiments, probe tip 140 includes tube 502 and sleeve 504 is not included. Although distal end 416 as illustrated in FIG. 5 includes inner cladding 404 surrounding core 402, optical fiber 410 may instead include outer cladding 406 surrounding core 402 (i.e., without an inner cladding), without any loss of generality. As described above, the embodiment of FIG. 5 is merely shown as an example. One of ordinary skill in the art can appreciate other embodiments with different configurations (e.g., a completely straight probe tip, or a probe tip with a distal end that is flush with the distal ends of optical fiber 410 and tube 502) which are also not outside the scope of this disclosure.

Color Adjustability of Illumination Light

As described above, it may be beneficial to color-tune an illumination light output of an illuminated laser probe for many reasons, such as to better reveal textures of different tissues, or to make a laser treatment beam more visible (e.g., more obvious) to the surgeon in order to deliver laser coagulation treatment more accurately. Accordingly, the embodiments described below provide systems and methods for compactly and efficiently color-tuning the illumination light of surgical laser systems having laser probes coupled therewith.

Generally, the systems and methods for adjusting illumination light color described below may be controlled by a user, e.g., a surgeon or other medical practitioner, via any suitable methods or mechanisms. For example, in certain embodiments, the systems and methods described below may be controlled via a foot switch, voice commands, surgical console, and/or other mechanisms used to control/toggle other functions or parameters of surgical laser systems. In certain embodiments, a color of illumination light may be adjusted via selection of a color preset from a plurality of color presets provided to the user via a graphical user interface (GUI) of the surgical laser system. In certain embodiments, the GUI may display a custom color-picking window comprising an x-y chromaticity chart, wherein the user may select a point within the x-y chromaticity chart, thereby causing the surgical laser system to adjust a color of illumination light to the color corresponding to the point.

Electronically Color-Adjustable Surgical Laser Systems

Figure 6:
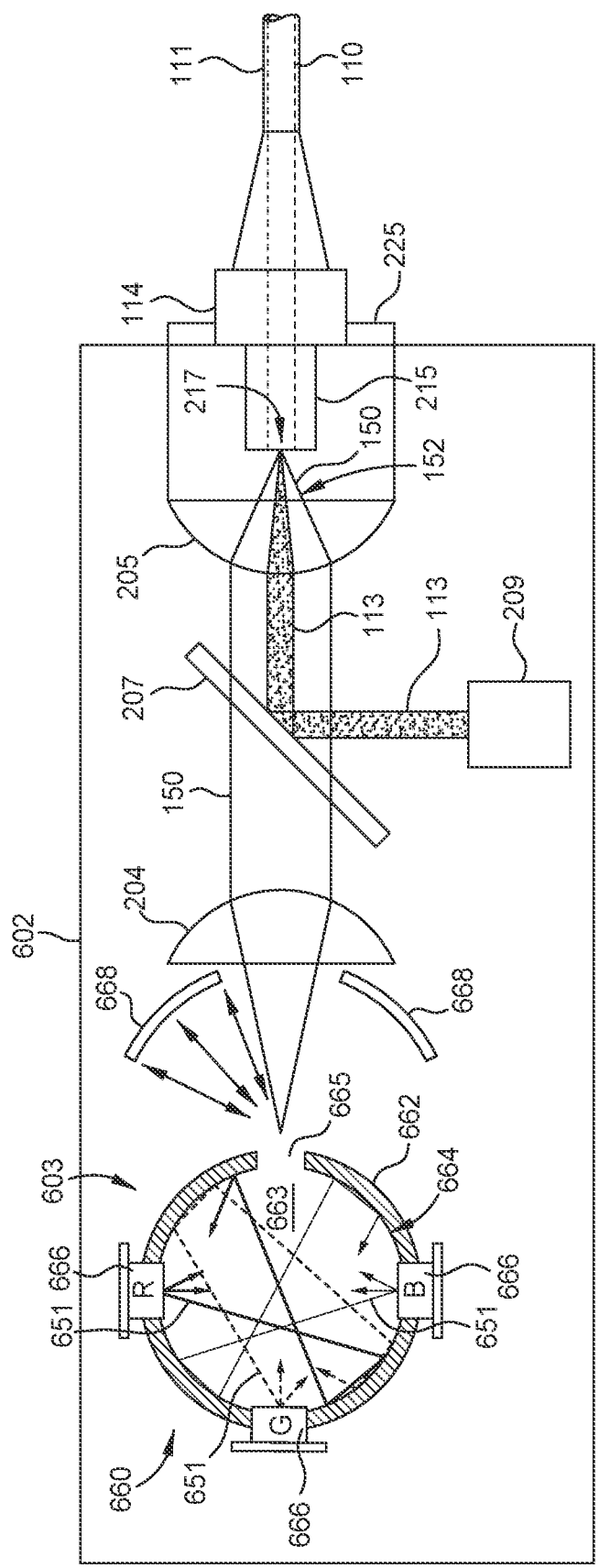
FIG. 6 illustrates a schematic plan view of a surgical laser system with electronically color-adjustable illumination light, in accordance with certain embodiments of the present disclosure.

FIG. 6 schematically illustrates a plan view of surgical laser system 602, which provides adjustability of the color of illumination light generated and propagated thereby, in accordance with certain embodiments of the present disclosure. More particularly, surgical laser system 602 includes light sources having red-green-blue (RGB) light emitting diodes (LEDs) disposed within a light-homogenizing scattering cell, wherein an intensity of individual LEDs may be tuned via regulation of current flow therethrough to adjust the color of generated illumination light that is then collimated and relayed to an illuminated laser probe. Accordingly, surgical laser system 602 provides a compact, electronically color-tunable system generating spatially uniform and collimated light for, e.g., ophthalmic procedures. Note that surgical laser system 602 includes many of the features described above with reference to, e.g., systems 100 and 202 in FIGS. 1-2. Therefore, certain corresponding details of such features are omitted for brevity.

Referring to FIG. 6, surgical laser system 602 includes illumination light source 603 for generating illumination light 150, as well as laser source 209 for generating laser beam 113. Similar to surgical laser system 202, surgical laser system 602 further includes first lens 204 for collimating illumination light 150, beam splitter 207 for multiplexing illumination light 150 and laser beam 113 into multiplexed beam 152, and second lens 205, which focuses multiplexed beam 152 onto an interface plane of a proximal end of an optical fiber disposed within optical cable 111. Optical fiber cable 111 couples to optical port 225 of the surgical laser system 602 via a connector 114. Note that in certain embodiments, surgical laser system 602 may include additional components, such one or more lenses, diffractive elements, beam splitters, and other optical relay devices for relaying laser and illumination light beams between their respective sources and desired ports. Together with the optical devices described, these components may be referred to as an "optical relay system."

Illumination light source 603 includes a plurality of light-emitting diodes (LEDs) 666, e.g., red-green-blue (RGB) LEDs, arranged within light scattering cell 660. As shown in FIG. 6, light scattering cell 660 includes a hollow, three-dimensional pod having at least one wall 662 with an interior light scattering surface 664 that faces, and at least partially defines, an interior volume 663. One or more of LEDs 666 may be arranged on each interior light scattering surface 664, or a separate substrate within light scattering cell 660 or exterior to light scattering cell 660 (e.g., planar substrate 667), and configured to generate monochromatic light 651 that propagates into/within interior volume 663. In certain embodiments, as shown in FIG. 6, light scattering cell 660 includes one spherical wall 662 having one light scattering surface 664, e.g., thus forming a pod with a spherical shape. The spherical shape of light scattering cell 600 may provide better homogenization of illumination light as compared to other morphologies. In such embodiments, at least three LEDs 666 (e.g., one red, one green, and one blue LED) may be arranged on one or more planar substrates 667 positioned exterior to light scattering cell 660, wherein LEDs 666 may be disposed through an opening in wall 662 to face interior volume 663 and propagate light therein. In some other examples, however, LEDs 666 may be arranged directly on interior light scattering surface 664 of wall 662.

In other embodiments, light scattering cell 660 includes at least four walls 662, e.g., four planar walls forming a pod with a pyramidal shape. For example, in certain embodiments, light scattering cell 660 includes six or more walls 662. Light scattering cell 660 further includes port 665 disposed through at least one wall 662 thereof for allowing internally reflected/scattered illumination light 150 to escape (e.g., for transmitting illumination light 150 out of light scattering cell 660). Generally, port 665 is circular and has a diameter substantially the same or greater than a diameter of the core of an optical fiber coupled to surgical laser system 602 (e.g., optical fiber 110) to facilitate a spatial extent and/or angular spread that enables maximum coupling of illumination light 150 into the optical fiber.

In certain embodiments, light scattering cell 660 is a Lambertian light scattering cell having interior light scattering surfaces 664 configured to scatter light diffusely in all directions, or a near-Lambertian light scattering cell having interior light scattering surfaces 664 configured to scatter light diffusely in nearly all directions. In certain embodiments, interior light scattering surfaces 664 have a reflective coating formed thereon that comprises barium sulfate, magnesium oxide, or other reflective materials. Note, however, that other morphologies and materials for light scattering cell 660 and components thereof are also contemplated.

During operation, RGB LEDs 666 within light scattering cell 660 each generate monochromatic light 651 of red, green, or blue wavelengths. The generated monochromatic light 651 is reflected and scattered within interior volume 663 of light scattering cell 660 to homogenize the light angularly and spatially, and a portion thereof escapes light scattering cell 660 through port 665 as scattering-mixed illumination light 150. To adjust (e.g., shift) the color of escaped illumination light 150, an intensity of each RGB LED 666 may be adjusted via corresponding LED driver(s) electronically coupled therewith utilizing constant current reduction (CCR), pulse width modulation (PWM), digital addressable lighting interface (DALI), digital multiplex (DMX), or other electronic techniques to regulate current flowing through each LED 666.

The escaped illumination light 150 is input into first lens 204, which, as described above, may be a collimating lens for transforming illumination light 150 into a beam of light with parallel rays for propagation onto the optical fiber within optical fiber cable 111. In certain embodiments, first lens 204 is positioned adjacent and in close proximity to port 665 to ensure that most, if not all, of escaped illumination light 150 is passed through first lens 204 for collimation before being relayed by the remainder of the optical relay system. In certain embodiments, surgical laser system 602 further includes one or more annular and spherical reflectors 668 disposed between light scattering cell 660 and first lens 204 for reflecting peripheral illumination light 150 back through port 665 and into interior volume 663 of light scattering cell 660 for recycling. In such embodiments, annular and spherical reflectors 668 prevent escaped illumination light 150 from scattering in all directions, and facilitate recycling of most, if not all, peripheral illumination light 150 back into light scattering cell 660 for eventual transmission to first lens 204. Accordingly, surgical illumination system 602 may facilitate maximum utilization and homogenization of almost all illumination light generated by light scattering cell 660.

In certain embodiments, each of annular and spherical reflectors 668 have a center of curvature that coincides with a center of port 665 to facilitate maximum reflection of illumination light 150 back into light scattering cell 660. In certain embodiments, annular and spherical reflectors 668 are arranged to reflect (back into light scattering cell 660) escaped illumination light 150 peripheral to (e.g., outside of) an incidence angle of about 45° or more relative to an optical axis between port 665 and first lens 204. For example, in certain embodiments, annular and spherical reflectors 668 are arranged to reflect illumination light 150 peripheral to an incidence angle of about 60°, about 70°, about 80°, about 90°, or more, relative to an optical axis between port 665 and first lens 204. In certain embodiments, a distance between medial ends of spherical reflectors 668 is substantially the same or greater than a diameter of the core of an optical fiber coupled to surgical laser system 602 (e.g., optical fiber 110) to facilitate a spatial extent and/or angular spread of illumination light 150 that enables maximum coupling of illumination light 150 into the optical fiber.

Figure 7:
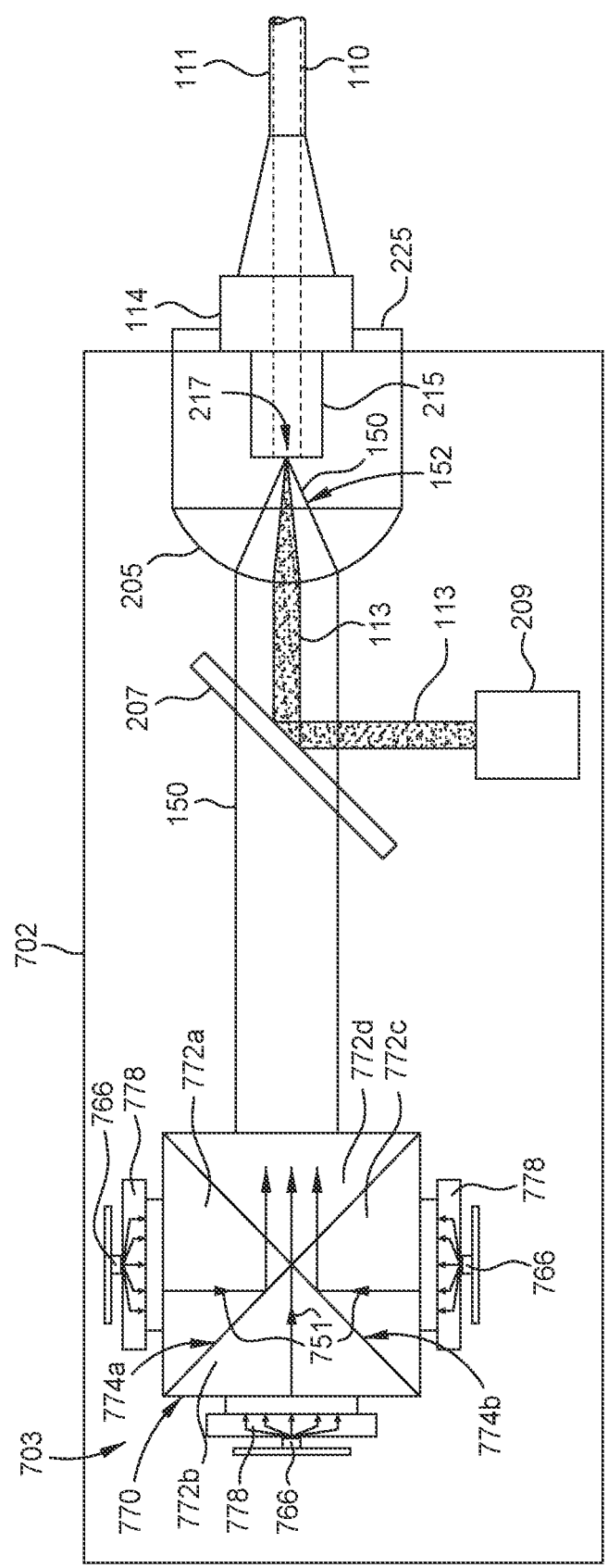
FIG. 7 illustrates a schematic plan view of another surgical laser system with electronically color-adjustable illumination light, in accordance with certain embodiments of the present disclosure.

FIG. 7 schematically illustrates a plan view of surgical laser system 702, which, similar to surgical laser system 602, provides electronic adjustability of the color of illumination light generated and propagated thereby, in accordance with certain embodiments of the present disclosure. Surgical laser system 702 is substantially similar to surgical laser system 602. Therefore, many of the features described above with reference to FIG. 6 are omitted below for brevity.

As shown, surgical laser system 702 includes illumination light source 703. Similar to illumination light source 603, illumination light source 703 includes a plurality of RGB LEDs 766; however, LEDs 766 are arranged around, and directed toward, RGB light-combining prism module 770. Prism module 770 includes an arrangement of one or more prisms 772, each prism 772 having one or more dichroic surfaces 774 (774a and 774b are depicted in FIG. 7) configured to reflect/transmit different wavelengths of monochromatic light 751. The reflection and/or transmission of monochromatic light 751 by dichroic surfaces 774 combines monochromatic light 751 into illumination light 150, and further directs combined illumination light 150 toward first lens 204. As described above, first lens 204 may be a collimating lens for transforming illumination light 150 into a beam of light with parallel rays for propagation onto the optical fiber within optical fiber cable 111.

In certain embodiments, prism module 770 includes one or more prisms 772 arranged in a cuboid arrangement. In certain embodiments, prism module 770 includes one or more prisms 772 arranged in a pyramidal arrangement or other suitable three-dimensional arrangement. In certain embodiments, prisms 772 include rectangular prisms, triangular prisms, right-angle prisms, hexagonal prisms, or the like.

In the example depicted in FIG. 7, surgical laser system 702 includes light source 703 having a red ("R"), a green ("G"), and a blue ("B") LED 766 arranged around and facing (e.g., directed light toward) a cuboid prism module 770, which includes four right-angle prisms 772a-d. Prisms 772a-d are arranged such that they form a cuboid prism module 770 having one or more internal red reflective surfaces 774a facing red LED 766 for reflecting all (100%), or substantially all (about 100%), of red monochromatic light 751 generated thereby, and one or more internal blue reflective surfaces 774b facing blue LED 755 for reflecting all, or substantially all, of blue monochromatic light 751 generated thereby. Surfaces 774a and 774b may further be configured to transmit all, or substantially all, of green monochromatic light 751 generated by green LED 766, thus facilitating unrestricted transmission of green monochromatic light 751 through prism module 770. Accordingly, the arrangement of prisms 772a-d and dichroic surfaces 774 thereof facilitates combining of monochromatic light 751 generated by each red, green, or blue LED 766 into illumination light 150, and directing of illumination light 150 to, e.g., first lens 204.

As further shown in FIG. 7, in certain embodiments, a collimator 778 may be disposed between each LED 776 and prism module 770 for collimating monochromatic light 751 generated by each LED 776, prior to monochromatic light 751 entering prism module 770. Collimators 778 may, in certain embodiments, replace first lens 204. In such embodiments, collimators 778 may include collimating lenses, such as ultra-flat, total internal reflection (TIR) non-imaging lenses. Other types of collimators, however, are also contemplated.

During operation, RGB LEDs 776 generate monochromatic light 751 of red, green, or blue wavelengths. Monochromatic light 751 enters prism module 770, wherein dichroic surfaces 774 of arranged prisms 772 reflect and/or transmit the different wavelengths of monochromatic light 751, thereby combining, e.g., angularly and spatially angularly and spatially, monochromatic light 751 into illumination light 150. Illumination light 150 is directed by prism module 770 toward the optical relay system of surgical laser system 702, which relays illumination light 150 toward an illuminated laser probe, e.g., probe 108. To adjust (e.g., shift) the color of illumination light 150, the intensity of each RGB LED 766 may be adjusted via corresponding LED drivers utilizing constant current reduction (CCR), pulse width modulation (PWM), digital addressable lighting interface (DALI), digital multiplex (DMX), or other electronic techniques to regulate current flowing through LEDs 766 and allow light output to be adjusted accordingly. Thus, similar to surgical laser system 602, surgical laser system 702 provides a compact, electronically color-tunable system generating uniform and collimated light for, e.g., ophthalmic procedures.

Surgical Laser Systems with Filters for Color Adjustability

As an alternative to electronically-adjustable systems, color filters may be utilized to tune the color of illumination light generated and propagated by surgical laser systems.

FIGS. 8A-8B depict surgical laser system 802, which provides adjustability of illumination light color via a color filter, in accordance with certain embodiments of the present disclosure. FIG. 8A schematically illustrates a plan view of surgical laser system 802, while FIG. 8B illustrates a front view of multi-color filter wheel 806 thereof. Note that surgical laser system 802 includes many of the features described above with reference to, e.g., systems 100 and 202 in FIGS. 1-2. Therefore, certain corresponding details of such features are omitted for brevity.

Surgical laser system 802 utilizes multi-color filter wheel 806, which is disposed along a light propagation path of illumination light 150 generated by illumination light source 203, to color-tune illumination light 150. In the example of FIGS. 8A-8B, filter wheel 806 is disposed between first lens 204 and beam splitter 207. However, other positions along the light propagation path of illumination light 150 through surgical laser system 802 are also contemplated. Further, filter wheel 806 may be used in combination with other filter devices described herein, such as filter slide 906 and/or tilt filter 1007 described below.

As described above, illumination light source 203 may include any suitable type of light source, such as a white light LED light source, a broadband laser light source, an incoherent light source (e.g., a xenon or halogen light source), or the like. Similarly, illumination light 150 can be any spectrum of illumination light, including, but not limited to, visible light or white light.

As shown in FIG. 8B, in certain embodiments, filter wheel 806 includes a plurality of filters 807 arranged annularly about center C (e.g., arranged in a circle around center C) of filter wheel 806, wherein only a single filter 807 is disposed along the light propagation path of illumination light 150 at a given time. Each filter 807 comprises a sheet or film of transparent material configured to modify a color of illumination light 150 by selective absorption of certain wavelengths of light over others. In certain embodiments, each filter 807 includes a pane of glass or plastic material that is dyed a desired color, the desired color corresponding to the color, or wavelength, of illumination light 150 transmitted therethrough. Examples of suitable colors for filters 807 include red, green, blue, orange, yellow, teal, violet, warm white, cool white, etc. In certain embodiments, two or more of filters 807 selectively transmit a different color of illumination light 150. Accordingly, by rotating filter wheel 806 about its center to change which filter 807 is disposed along the light propagation path of illumination light 150, one can adjustably control a color of illumination light 150 propagated to an illuminated laser probe, e.g., probe 108, of surgical laser system 802. In certain examples, filter wheel 806 is automatically rotated to transmit a desired color by a rotary actuator, such as an electric rotary stepper motor or other servo motor, which may be controlled based on user input. Other types of mechanical actuators are also contemplated.

Figure 9A:
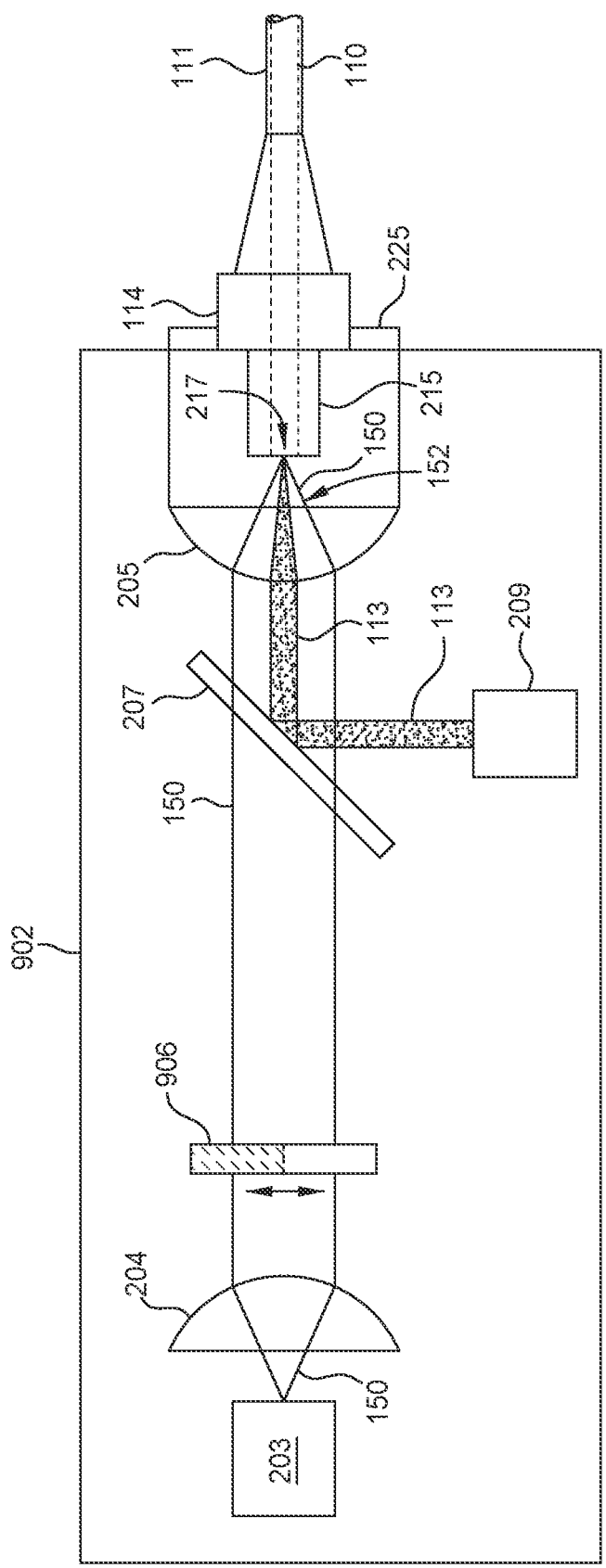
FIG. 9A illustrates a schematic plan view of another surgical laser system with mechanically color-adjustable illumination light, in accordance with certain embodiments of the present disclosure.
Figure 9B:
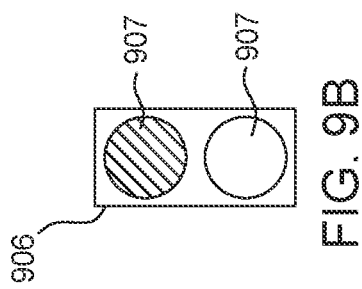
FIG. 9B illustrates an enlarged front view of a component of the surgical laser system of FIG. 9A.

FIGS. 9A-9B depict surgical laser system 902, which, similar to surgical laser system 802, provides adjustability of illumination light color via a color filter, in accordance with certain embodiments of the present disclosure. FIG. 9A schematically illustrates a plan view of surgical laser system 902, while FIG. 9B illustrates a side view of filter slide 906 thereof. Surgical laser system 902 is substantially similar to surgical laser system 802. Therefore, many of the features described above with reference to FIGS. 8A-8B are omitted below for brevity.

Surgical laser system 902 utilizes filter slide 906, which is disposed along a light propagation path of illumination light 150 generated by illumination light source 203, to color-tune illumination light 150. In the example of FIGS. 9A-9B, filter slide 906 is disposed between first lens 204 and beam splitter 207. However, other positions along the light propagation path of illumination light 150 through surgical laser system 902 are also contemplated. Further, filter slide 906 may be used in combination with other filter devices described herein, such as filter wheel 806 described above, and/or tilt filter 1007 described below.

As shown in FIG. 9B, in certain embodiments, filter slide 906 includes two or more filters 907 laterally arranged on backing 908. In certain embodiments, filters 907 are arranged linearly on backing 908. Backing 908 is configured to laterally slide or translate, e.g., along a track, via any suitable actuation mechanism, such that only a single filter 907 is disposed along the light propagation path of illumination light 150 at a given time. Each filter 907 comprises a sheet or film of transparent material configured to modify a color of illumination light 150 by selective absorption of certain wavelengths of light over others. In certain embodiments, each filter 907 includes a pane of glass or plastic material that is dyed a desired color, the desired color corresponding to the color, or wavelength, of illumination light 150 transmitted therethrough. Examples of suitable colors for filters 907 include red, green, blue, orange, yellow, teal, violet, warm white, cool white, etc. In certain embodiments, two or more of filters 907 are configured to selectively transmit a different color of illumination light 150. For example, in specific embodiments, filter slide 906 is a dual-color-filter slide and includes a first, warm white filter 907, and a second, cool white filter 907. (Warm white illumination light may be optimal for vitrectomies and distinguishing retinal textures, while cool white illumination light may be optimal for simultaneous use with a laser treatment beam.) Accordingly, by mechanically translating backing 908 to change which filter 907 is disposed along the light propagation path of illumination light 150, one can adjustably control a color of illumination light 150 propagated to an illuminated laser probe, e.g., probe 108, of surgical laser system 902. In certain examples, filter slide 906 is automatically translated to transmit a desired color by a linear actuator, such as an electric linear stepper motor or other servo motor, which may be controlled based on user input. Other types of mechanical actuators are also contemplated.

Figure 10:
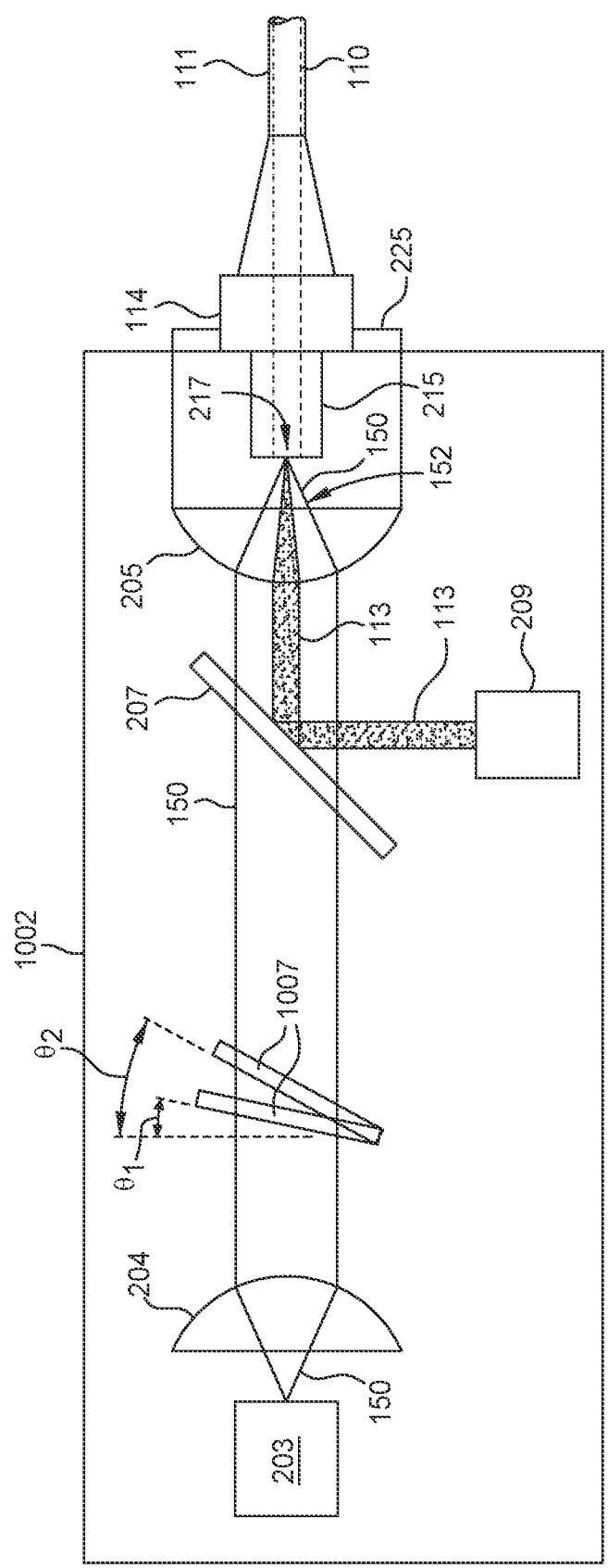
FIG. 10 illustrates a schematic plan view of yet another surgical laser system with mechanically color-adjustable illumination light, in accordance with certain embodiments of the present disclosure.

FIG. 10 schematically illustrates a plan view of surgical laser system 1002, which, similar to surgical laser systems 802 and 902, provides adjustability of illumination light color via a color filter, in accordance with certain embodiments of the present disclosure. Surgical laser system 1002 is substantially similar to surgical laser systems 802 and 902. Therefore, many of the features described above with reference to FIGS. 8A-8B and 9A-9B are omitted below for brevity.

As shown, surgical laser system 1002 utilizes a tilt filter 1007, which is disposed along a light propagation path of illumination light 150 generated by illumination light source 203. In the example of FIG. 10, tilt filter 1007 is disposed between first lens 204 and beam splitter 207. However, other positions along the light propagation path of illumination light 150 through surgical laser system 1002 are also contemplated. Further, filter slide 906 may be used in combination with other filter devices described herein, such as filter wheel 806 and/or filter slide 906 described above.

Tilt filter 1007 comprises a dichroic filter having a spectral response for transmittance and/or reflectance of illumination light 150 that is angularly-sensitive. In other words, the wavelengths of illumination light 150 that are transmitted or reflected by tilt filter 1007 depend on an angle (e.g., a tilt angle) of tilt filter 1007 relative to a direction of propagation of illumination light 150. Accordingly, changing the tilt angle of tilt filter 1007 between, e.g., a first angle $\Theta_1$ and a second angle $\Theta_2$, causes the color of illumination light 150 transmitted by tilt filter 1007 to change between at least a first color and a second color, wherein the first color and second color may correspond to angles $\Theta_1$ and $\Theta_2$, respectively. Thus, in the example of FIG. 10, only a single filter is needed to adjust between two or more colors of illumination light 150, as compared to the plurality of filters utilized in each of FIGS. 8A-8B and 9A-9B. In certain examples, tilt filter 1007 is automatically tilted/rotated to transmit a desired color by a rotary actuator, such as an electric rotary stepper motor or other servo motor, which may be controlled based on user input. Other types of mechanical actuators are also contemplated.

In certain embodiments, tilt filter 1007 comprises a stack of one or more thin layers of transparent dielectric materials, e.g., an optical interference coating, configured to cause constructive and/or destructive interference of illumination light 150 to change a color thereof, depending on an angle of incidence of illumination light 150. In certain embodiments, tilt filter 1007 is configured to have a sensitive blue-shift dependence on tilt angle, wherein the color of illumination light 150 transmitted by tilt filter 1007 shifts towards blue with a greater tilt angle of tilt filter 1007. In such embodiments, for example, the color of illumination light 150 may be controllably adjusted between a warm white color and a cool white color by shifting the tilt angle of tile filter 1007 between, e.g., first angle $\Theta_1$ and second angle $\Theta_2$.

In sum, surgical laser systems 802, 902, and 1002 provide compact, mechanically color-tunable systems for generating uniform and collimated light for, e.g., ophthalmic procedures.

As noted above, the color-adjustable systems and methods described herein may be controlled based on user input via any suitable mechanisms. For example, in certain embodiments, the systems and methods may be controlled via a foot switch, a touchscreen graphical user interface (GUI) on a surgical console, mechanical buttons/switches/dials on a surgical console, mechanical buttons/switches/dials on a laser probe, voice commands, or any suitable mechanisms used to control/toggle other functions or parameters of surgical laser systems. In certain embodiments, a color of illumination light may be adjusted via user selection of a color preset from a plurality of color presets provided to the user via a GUI of the surgical laser system. In other embodiments, the GUI may display a custom color-picking window comprising an x-y chromaticity chart, wherein the user may select a point within the x-y chromaticity chart, thereby causing the surgical laser system to adjust a color of illumination light to the color corresponding to the point.

The user inputs described above may be converted by a processor (e.g., a processor of a surgical console in which the surgical laser system is integrated) into digital signals for controlling the color adjustment of illumination light. For example, in certain embodiments, the digital signals may be provided to one or more drivers for a plurality of LEDs of an illumination light source of the surgical laser system, which may then adjust the intensity of one or more of the LEDs according to the digital signals to arrive at the color desired by the user. In certain embodiments, the digital signals may be provided to a mechanical actuator, which may then actuate (e.g., rotate, slide, tilt) a filter device of the surgical laser system according to the digital signals to arrive at the color desired by the user.

Improved Illuminated Laser Probe Stiffness

In addition to providing methods and systems for adjusting the color of illumination light output from a single-core optical fiber-illuminated laser probe, certain embodiments described herein provide an improved illuminated laser probe having increased stiffness for easier manipulation and/or maneuvering thereof within an ocular space during ophthalmic procedures. In turn, the easier manipulation and/or maneuvering of the illuminated laser probe facilitates improved efficiency and accuracy of laser treatment during ophthalmic procedures. As is described in more detail below, the increased stiffness of the probe is enabled by beveling a distal end face of the optical fiber to increase an illumination angle thereof, thereby allowing a reduced curvature of the probe and thus, an enlarged thickness, without sacrificing illumination angle and/or ease of insertion/removal of the probe from, e.g., a trocar cannula.

Figure 11:
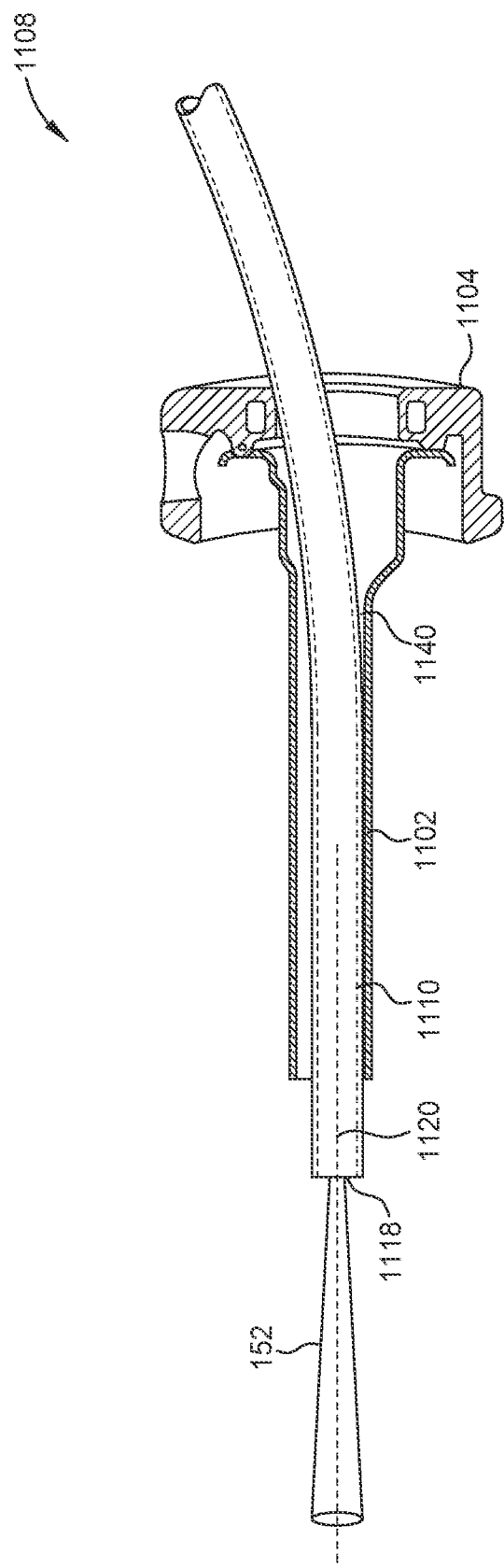
FIG. 11 illustrates a partial cross-sectional view of a conventional probe tip and optical fiber, in accordance with certain embodiments of the present disclosure.

FIG. 11 illustrates a partial cross-sectional view of a probe tip 1140 of a conventional optical fiber-illuminated laser probe 1108 when inserted into a trocar cannula 1104. As shown, the probe tip 1140 includes tube 1102, which surrounds an optical fiber 1110 having a distal end face 1118 that is normal to an optical axis 1120 thereof. Because the optical fiber 1110 has a normal end face 1118, the tube 1102 comprises a large degree of curvature to facilitate a high illumination (and laser) angle when the probe tip 1140 is inserted into the intraocular space of a patient's eye, thus enabling illumination and treatment of peripheral tissues therein. However, due to the large degree of curvature, a thickness of the tube 1102 is physically constrained in order to facilitate insertion and removal of the probe tip 1140 into/from the trocar cannula 1104. The restricted thickness of the tube 1102, in turn, inherently limits a stiffness of the probe tip 1140, which may cause suboptimal probe stability while maneuvering the probe tip 1140 within the intraocular space, thereby increasing the difficulty of accurately placing the probe and directing the laser treatment beam during such procedures.

Figure 12:
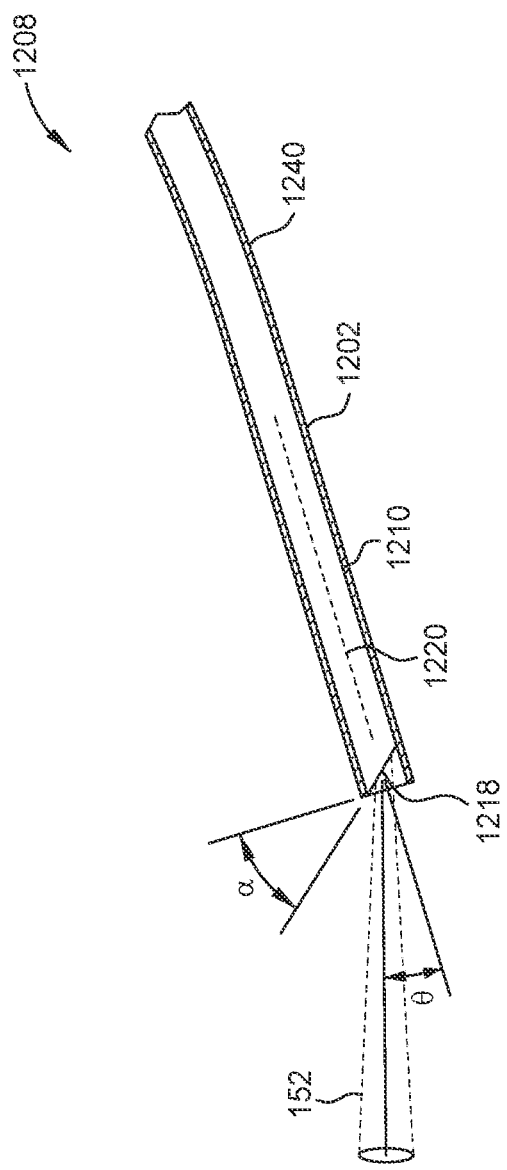
FIG. 12 illustrates a partial cross-sectional view of an improved probe tip and optical fiber, in accordance with certain embodiments of the present disclosure.

FIG. 12 illustrates a cross-sectional view of a probe tip 1240 of an improved optical fiber-illuminated laser probe 1208, according to embodiments described herein. As shown, the probe tip 1240 includes tube 1202, which surrounds an optical fiber 1210 disposed within the probe tip 1240. Unlike the optical fiber 1110, optical fiber 1210 has a beveled distal end face 1218 (e.g., non-normal to an optical axis thereof), which creates, through refraction, a high illumination (and laser) angle for the laser probe 1208 substantially similar to that created by the curvature or probe tip 1140 described above. For example, beveled distal end face 1218 is configured to transmit illumination light 152 at an angle between 5 degrees and 20 degrees relative to optical axis 1220 of optical fiber 1210. Thus, because of the beveled morphology of the end face 1218, the tube 1202 does not necessitate such a large degree of curvature, and instead, the tube 1202 has a much shallower curvature, as shown in FIG. 12. And, because the tube 1202 has a shallow curvature, a thickness of the tube 1202 may be increased, thereby providing improved stiffness for the probe 1208 and improved stability when inserted and maneuvered within the intraocular space, while maintaining ease of insertion and removal from a trocar cannula.

As described above, embodiments of the present disclosure generally relate to ophthalmic surgical laser systems with single-core optical fiber-illuminated laser probes. While some illuminated laser probes provide only white light illumination in combination with laser photocoagulation, the systems and probes described herein provide color adjustability of illumination light, thereby facilitating intraocular illumination with improved contrast between different types of tissues and improved accuracy of treatment. Further, in certain embodiments, the methods and systems disclosed herein enable increased probe stiffness for single-core optical fiber-illuminated laser probes while maintaining high illumination angle and ease of insertion/removal into/from a patient's eye. Accordingly, the probes described herein provide improved stability when inserted and maneuvered within the intraocular space, thereby facilitating greater efficiency and accuracy of laser treatment during ophthalmic procedures.

What is claimed is:
1. A surgical laser system, comprising:
   a laser source configured to emit a laser light;
   an illumination source configured to emit a color-adjustable illumination light, the illumination source comprising a plurality of light-emitting diodes (LEDs) arranged on a light scattering cell;
   an optical fiber comprising a fiber core circumferentially surrounded by one or more cladding layers, wherein the fiber core is configured to transmit the laser light emitted from the laser source and the illumination light emitted from the illumination source, and wherein the one or more cladding layers are configured to transmit only the illumination light emitted from the illumination source; and an optical relay system configured to direct the laser light emitted from the laser source onto the fiber core and the illumination light emitted from the illumination source onto the fiber core and the one or more cladding layers;

wherein the optical fiber comprises a first end and a second end, and wherein:

the first end is configured to receive the laser light and the illumination light directed by the optical relay system;

the second end is disposed within a light probe for insertion into an eye; and the second end comprises a beveled tip configured to transmit the laser light and the illumination light at an angle between 5 degrees and 20 degrees relative to an optical axis of the optical fiber.

2. The surgical laser system of claim 1, wherein the plurality of LEDs comprises a red LED, a green LED, and a blue LED.

3. The surgical laser system of claim 1, wherein the light scattering cell comprises a Lambertian scattering cell.

4. The surgical laser system of claim 1, wherein the light scattering cell comprises a three-dimensional Lambertian scattering cell comprising a plurality of walls at least partially defining an interior volume, wherein:

one or more of the plurality of walls comprises an interior light scattering surface facing the interior volume;

one or more of the plurality of walls comprises at least one of the plurality of LEDs arranged thereon and configured to emit the illumination light within the interior volume; and at least one of the plurality of walls comprises an aperture formed therein for transmitting the emitted illumination light from the interior volume toward the optical relay system.

5. The surgical laser system of claim 4, wherein the plurality of LEDs comprises a red LED, a green LED, and a blue LED.

6. A surgical laser system, comprising:

a laser source configured to emit a laser light;

an illumination source configured to emit a color-adjustable illumination light, the illumination source comprising a plurality of light-emitting diodes (LEDs) arranged on a light scattering cell;

an optical fiber comprising a fiber core circumferentially surrounded by one or more cladding layers, wherein the fiber core is configured to transmit the laser light emitted from the laser source and the illumination light emitted from the illumination source, and wherein the one or more cladding layers are configured to transmit only the illumination light emitted from the illumination source; and an optical relay system configured to direct the laser light emitted from the laser source onto the fiber core and the illumination light emitted from the illumination source onto the fiber core and the one or more cladding layers;

wherein the light scattering cell comprises a three-dimensional Lambertian scattering cell comprising a plurality of walls at least partially defining an interior volume, wherein:

one or more of the plurality of walls comprises an interior light scattering surface facing the interior volume;

one or more of the plurality of walls comprises at least one of the plurality of LEDs arranged thereon and configured to emit the illumination light within the interior volume; and at least one of the plurality of walls comprises an aperture formed therein for transmitting the emitted illumination light from the interior volume toward the optical relay system; and a light recycling mirror disposed outside of the interior volume of the three-dimensional Lambertian scattering cell and adjacent to the aperture, the light recycling mirror configured to reflect peripheral light outside of a desired light beam angle back into the interior volume for recycling.

7. The surgical laser system of claim 6, wherein the light recycling mirror comprises a panchromatically reflective annular spherical mirror.

8. A surgical laser system, comprising:

a laser source configured to emit a laser light;

an illumination source configured to emit a color-adjustable illumination light, the illumination source comprising:

a red-green-blue (RGB) light-combining prism configured to combine monochromatic light emitted from a plurality of light-emitting diodes (LEDs) into the illumination light, the plurality of LEDs comprising at least a red LED, a green LED, and a blue LED;

the plurality of LEDs comprising at least the red LED, the green LED, and the blue LED, the plurality of LEDs arranged around the RGB light-combining prism and configured to emit the monochromatic light; and a collimator mated to each of the plurality of LEDs and configured to direct the monochromatic light emitted from the LED toward the RGB light-combining prism;

an optical fiber comprising a fiber core circumferentially surrounded by one or more cladding layers, wherein the fiber core is configured to transmit the laser light emitted from the laser source and the illumination light emitted from the illumination source, and wherein the one or more cladding layers are configured to transmit only the illumination light emitted from the illumination source; and an optical relay system configured to direct the laser light emitted from the laser source onto the fiber core and the illumination light emitted from the illumination source onto the fiber core and the one or more cladding layers.

9. The surgical laser system of claim 8, wherein the RGB light-combining prism comprises:

a red reflective surface facing the at least the red LED, the red reflective surface configured to reflect about 100% of the monochromatic light emitted by the red LED; and a blue reflective surface facing the at least the blue LED, the blue reflective surface configured to reflect about 100% of the monochromatic light emitted by the blue LED.

10. The surgical laser system of claim 9, wherein the RGB light-combining prism is further configured to transmit about 100% of the monochromatic light emitted by the green LED.

11. The surgical laser system of claim 8, wherein the optical fiber comprises a first end and a second end, and wherein:

the first end is configured to receive the laser light and the illumination light directed by the optical relay system;

the second end is disposed within a light probe for insertion into an eye; and the second end comprises a beveled tip configured to transmit the laser light and the illumination light at an angle between 5 degrees and 20 degrees relative to an optical axis of the optical fiber.

12. A surgical laser system, comprising:

a laser source configured to emit a laser light;

an illumination source configured to emit an illumination light;

a filter assembly configured to transmit and adjust a color of the illumination light emitted by the illumination source, wherein the color of the illumination light emitted by the illumination source may be adjusted by changing a physical position or orientation of the filter assembly;

an optical fiber comprising a fiber core circumferentially surrounded by one or more cladding layers, wherein the fiber core is configured to transmit the laser light emitted from the laser source and the illumination light emitted from the illumination source and transmitted through the filter assembly, and wherein the one or more cladding layers are configured to transmit only the illumination light emitted from the illumination source and transmitted through the filter assembly; and an optical relay system configured to direct the laser light emitted from the laser source onto the fiber core and the illumination light emitted from the illumination source and transmitted through the filter assembly onto the fiber core and the one or more cladding layers.

13. The surgical laser system of claim 12, wherein the filter assembly comprises a multi-color filter wheel comprising a plurality of color filters arranged annularly about a center of the multi-color filter wheel, and wherein the color of the illumination light emitted by the illumination source and transmitted through the multi-color filter wheel may be adjusted by rotating the multi-color filter wheel about the center.

14. The surgical laser system of claim 12, wherein the filter assembly comprises a light filter slide comprising a plurality of color filters linearly arranged, and wherein the color of the illumination light emitted by the illumination source and transmitted through the filter slide may be adjusted by laterally repositioning the filter slide relative to a propagation path of the illumination light emitted by the illumination source.

15. The surgical laser system of claim 12, wherein the filter assembly comprises a dichroic tilt filter, and wherein the color of the illumination light emitted by the illumination source and transmitted through the dichroic tilt filter may be adjusted by angularly tilting the dichroic tilt filter relative to a propagation path of the illumination light emitted by the illumination source.

16. The surgical laser system of claim 12, wherein the optical fiber comprises a first end and a second end, and wherein:

the first end is configured to receive the laser light and the illumination light directed by the optical relay system;

the second end is disposed within an light probe for insertion into an eye; and the second end comprises a beveled tip configured to transmit the laser light and the illumination light at an angle between 5 degrees and 20 degrees relative to an optical axis of the optical fiber.

* * * * *